United States Patent
Hata

(10) Patent No.: US 11,956,810 B2
(45) Date of Patent: Apr. 9, 2024

(54) RADIO CONTROL DEVICE, COMMUNICATION CONTROL METHOD, AND RADIO BASE STATION

(71) Applicant: NEC Corporation, Tokyo (JP)

(72) Inventor: Hideo Hata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 17/466,225

(22) Filed: Sep. 3, 2021

(65) Prior Publication Data

US 2022/0086865 A1 Mar. 17, 2022

(30) Foreign Application Priority Data

Sep. 15, 2020 (JP) ................. 2020-154238

(51) Int. Cl.
*H04W 72/12* (2023.01)
*H04W 72/04* (2023.01)
*H04W 72/0446* (2023.01)
*H04W 72/50* (2023.01)
*H04W 84/04* (2009.01)

(52) U.S. Cl.
CPC ..... *H04W 72/535* (2023.01); *H04W 72/0446* (2013.01); *H04W 84/042* (2013.01)

(58) Field of Classification Search
CPC .......... H04W 72/535; H04W 72/0446
USPC .......................................... 370/329
See application file for complete search history.

(56) References Cited

U.S. PATENT DOCUMENTS

| | | | |
|---|---|---|---|
| 2017/0064661 A1* | 3/2017 | Katagiri | H04J 3/0667 |
| 2017/0195981 A1* | 7/2017 | Shor | H04W 56/009 |
| 2017/0294955 A1* | 10/2017 | Tomioka | H04W 56/004 |
| 2018/0324726 A1* | 11/2018 | Griffioen | H04W 88/085 |

FOREIGN PATENT DOCUMENTS

| | | | |
|---|---|---|---|
| JP | WO2010013332 A1 * | 7/2008 | |
| JP | 2011-024099 A | 2/2011 | |
| JP | 2012-238934 A | 12/2012 | |

* cited by examiner

*Primary Examiner* — Faisal Choudhury

(57) ABSTRACT

A radio control device that can eliminate quality deterioration in a wireless communication system is provided. The radio control device (REC) includes a first delay unit configured to perform delay control based on a first delay time less than a unit processing time of a basic frame, on radio data in units of the basic frames of a CPRI (Common Public Radio Interface) frame, based on a desired data transmission timing in a radio device, and a radio data multiplexing unit configured to multiplex the radio data that has undergone the delay control to the basic frame.

4 Claims, 11 Drawing Sheets

Fig. 3

| TYPE | Xs=0 | USE | Xs=1 | USE | Xs=2 | USE | Xs=2 | USE |
|---|---|---|---|---|---|---|---|---|
| sync&timing | 0 | sync byte | 64 | HFN | 128 | BFN-low | 192 | BFN-high |
| slow C&M | 1 | slow C&M | 65 | slow C&M | 129 | slow C&M | 193 | slow C&M |
| L1 inband port. | 2 | version | 66 | startup | 130 | L1-reset-LOS | 194 | pointer p |
| reserve | 3 | reserve | 67 | reserve | 131 | reserve | 195 | reserve |
| Ctrl_AxC low Byte | 4 | Ctrl_AxC | 68 | Ctrl_AxC | 132 | Ctrl_AxC | 196 | Ctrl_AxC |
| ... | ... | ... | ... | ... | ... | ... | ... | ... |
| Ctrl_AxC High Byte | 7 | Ctrl_AxC | 71 | Ctrl_AxC | 135 | Ctrl_AxC | 199 | Ctrl_AxC |
| reserve | 8 | reserve | 72 | reserve | 136 | reserve | 200 | reserve |
| ... | ... | ... | ... | ... | ... | ... | ... | ... |
| reserve | 15 | reserve | 79 | reserve | 143 | reserve | 207 | reserve |
| vender specific | 16 | vender specific | 80 | vender specific | 144 | vender specific | 208 | vender specific |
| vender specific | 17 | vender specific | 81 | vender specific | 145 | vender specific | 209 | vender specific |
| vender specific | 18 | vender specific | 82 | vender specific | 146 | vender specific | 210 | vender specific |
| vender specific | 19 | vender specific | 83 | vender specific | 147 | vender specific | 211 | vender specific |
| ... | ... | ... | ... | ... | ... | ... | ... | ... |
| fast C&M | p | fast C&M | p+64 | fast C&M | p+128 | fast C&M | p+196 | fast C&M |
| ... | ... | ... | ... | ... | ... | ... | ... | ... |
| fast C&M | 63 | fast C&M | 127 | fast C&M | 191 | fast C&M | 255 | fast C&M |

US 11,956,810 B2

RADIO CONTROL DEVICE, COMMUNICATION CONTROL METHOD, AND RADIO BASE STATION

INCORPORATION BY REFERENCE

This application is based upon and claims the benefit of priority from Japanese patent application No. 2020-154238, filed on Sep. 15, 2020, the disclosure of which is incorporated herein in its entirety by reference.

TECHNICAL FIELD

The present disclosure relates to a radio control device, a communication control method, and a radio base station.

BACKGROUND ART

In mobile phone systems, radio base stations including radio control devices called REC (Radio Equipment Control) and radio devices called RE (Radio Equipment) are widely used. Radio base stations including radio control devices and radio devices are configured to separate functions implemented in the radio base stations into the radio control devices and the radio devices.

CPRI (Common Public Radio Interface) is adopted for an interface between a radio control device and a radio device. CPRI is a standard protocol interface between the radio control device and the radio device, and the standard protocol interface guarantees interconnectivity even if the radio control device and the radio device are provided by different vendors. The radio control device and the radio device may be placed physically spaced apart from each other. In a typical arrangement, the radio control device is placed in a main building of a communication common carrier and the radio device is placed at a remote base near an antenna.

When the radio control device and the radio device are connected to each other by optical cable or the like by using CPRI, a transmission delay time for data transmitted from the radio control device to take to be wirelessly output from the radio device is different depending on optical fiber cable length. A wireless communication system requires that the radio control device controls a data transmission timing at which radio data is wirelessly output from the radio device. A technique for performing delay control on radio data in order to control the data transmission timing is known (for example, Patent Literatures 1 and 2).
[Patent Literature 1]
Japanese Unexamined Patent Application Publication No. 2012-238934
[Patent Literature 2]
Japanese Unexamined Patent Application Publication No. 2011-024099

In delay control methods disclosed in Patent Literatures 1 and 2, a transmission timing of a CPRI frame transmitted from the radio control device may deviate, synchronization may be lost between the radio control device and the radio device, and momentary interruption may occur. In this case, appropriate data transmission is not performed from the radio device, which causes quality deterioration in the wireless communication system.

SUMMARY

One of objects of the present disclosure is made to solve the above problem, and is to provide a radio control device, a communication control method, and a radio base station that can eliminate quality deterioration in a wireless communication system.

A radio control device according to the present disclosure, comprising:
a first delay unit configured to perform delay control based on a first delay time less than a unit processing time of a basic frame, on radio data in units of basic frames of a CPRI (Common Public Radio Interface) frame, based on a desired data transmission timing in a radio device; and
a radio data multiplexing unit configured to multiplex the radio data that has undergone the delay control to the basic frame.

A communication control method according to the present disclosure, comprising
performing delay control based on a first delay time less than a unit processing time of a basic frame, on radio data in units of basic frames of a CPRI (Common Public Radio Interface) frame, based on a desired data transmission timing in a radio device; and
multiplexing the radio data that has undergone the delay control to the basic frame.

A radio base station according to the present disclosure, comprising
a radio control device and a radio device,
wherein the radio control device is configured to
perform delay control based on a first delay time less than a unit processing time of a basic frame, on radio data in units of basic frames of a CPRI (Common Public Radio Interface) frame, based on a desired data transmission timing in the radio device, and
multiplex the radio data that has undergone the delay control to the basic frame.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 3 is a diagram showing control words set in respective basic frames.

that can implement a radio control device and the like according to each example embodiment of the present disclosure.

EMBODIMENTS

Hereinafter, example embodiments of the present disclosure will be described with reference to the drawings. In the following description and the drawings, there is some omission and simplification as appropriate to clarify explanation. In each of the drawings bellow, the same elements are assigned the same reference signs and duplicate description is omitted as needed.

(Study Leading to Example Embodiment)

Figure 1:
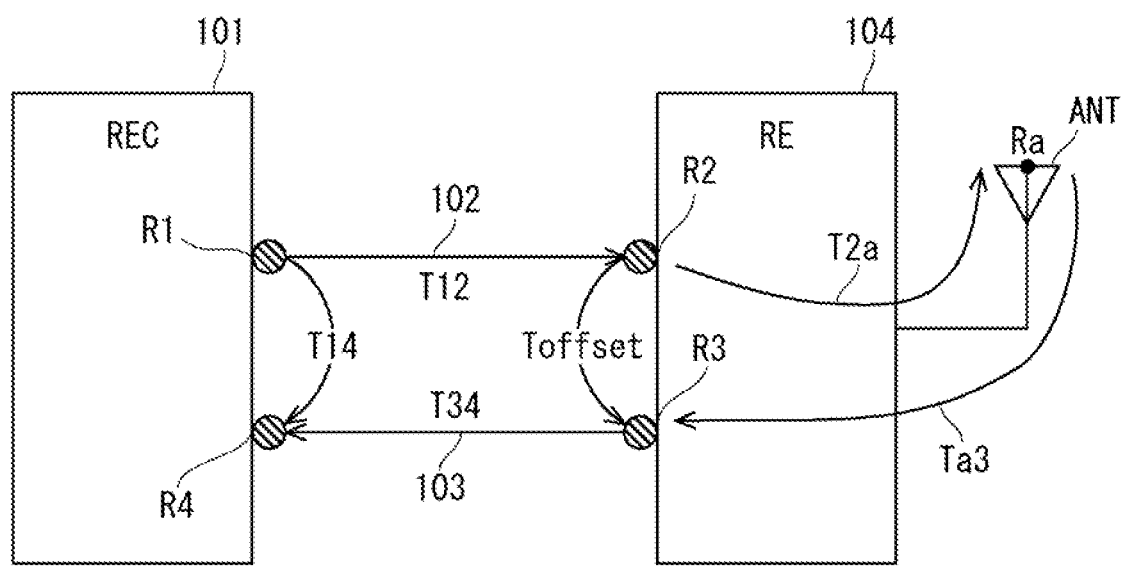
FIG. 1 is a diagram for illustrating a data transmission timing of radio data.

First, a configuration example of a radio base station including a radio control device and a radio device will be described with reference to FIG. 1, and then in the radio base station having the configuration, a transmission timing at which radio data is transmitted from the radio device will be described. FIG. 1 is a diagram for illustrating the data transmission timing of the radio data.

<Configuration Example of Radio Base Station>

As shown in FIG. 1, a radio base station 100 includes a radio control device 101, CPRI links 102 and 103, and a radio device 104. In FIG. 1, the radio base station 100 is shown as a configuration including only one radio device 104, but may have a configuration including a plurality of radio devices 104.

The radio control device 101 is a device that controls the radio base station 100, and performs baseband signal processing. The radio control device 101 connects and communicates with the radio device 104 via the CPRI links 102 and 103. The radio control device 101 communicates with the radio device 104 via the CPRI links 102 and 103 by CPRI. In the following description, the radio control device 101 may be described as REC 101.

The CPRI links 102 and 103 are, for example, optical cables. The CPRI links 102 and 103 are transmission paths for performing communication between the radio control device 101 and the radio device 104 by CPRI frame. The CPRI links 102 and 103 may be referred to as CPRI cables.

The radio device 104 performs RF signal processing, and transmits a radio signal to a mobile device (e.g., UE: User Equipment) (not shown). In the following description, the radio device 104 may be described as RE 104.

<Definition of Reference Points and Delay Times related to Data Transmission Timing>

First, in the REC 101 and the RE 104, reference points and respective transmission delay times related to a data transmission timing will be described. As reference points related to a data transmission/reception timing, points R1, R2, R3, R4, and Ra are mentioned. The point R1 is a point of a CPRI transmission end (DL: Down Link) of the REC 101. The point R2 is a point of a CPRI reception end (DL) of the RE 104. The point R3 is a point of a CPRI transmission end (UL: Up Link) of the RE 104. The point R4 is a point of a CPRI reception end (UL) of the REC 101. The point Ra is a point of an antenna end of an antenna ANT.

Next, transmission delay times related to the data transmission/reception timing will be described. As the transmission delay times related to the data transmission/reception timing, T12, T34, T14, T2a, Ta3, and Toffset are mentioned. T12 is a transmission delay time related to data transmission from the point R1 to the point R2, and determined according to a downlink cable length of the CPRI link 102. T34 is a transmission delay time related to data transmission from the point R3 to the point R4, and determined according to an uplink cable length of the CPRI link 103. In a general configuration of radio base stations, T12 and T34 are designed to be the same length of time. T14 is a time for a CPRI frame timing transmitted from the point R1 to take to be received at the point R4. Toffset is a time for the CPRI frame timing input from the point R2, which is an input end of the RE104, to take to be output to the point R3, which is an output end of the RE104. Toffset is generally a fixed value. T2a represents a transmission delay time (DL) from the point R2 in the radio device 104 to the point Ra, which is the antenna end. Ta3 represents a transmission delay time (UL) related to a transmission time from the point Ra, which is the antenna end in the radio device 104, to the point R3. T2a and Ta3 are also generally fixed values.

<Data Transmission Timing (When Delay Control is Not Performed)>

Next, a data transmission timing at which the radio data transmitted from the REC 101 is transmitted from the RE 104 will be described. First, when the REC 101 does not control the data transmission timing at which the radio data is transmitted from the RE 104, the data transmission timing of the radio data transmitted from the REC 101 is T12+T2a. In other words, in elapse of a time of T12+T2a from transmission of the radio data from the REC 101, the radio data is transmitted from the RE 104. As described above, T2a is a fixed value, and T12 is determined according to the downlink cable length, and so the data transmission timing is also determined according to the downlink cable length.

Relationship among T12, T34, T14, and Toffset can be expressed as T12+T34=T14−Toffset. Therefore, in a configuration of T12=T34, T12 is obtained from the following:

$$T12 = (T14 - \text{Toffset})/2.$$

T14 can be acquired by measuring a time for the CPRI frame timing transmitted from the point R1 of the REC 101 to take to return to the point R4.

<Data Transmission Timing (When Delay Control is Performed)>

Next, a case where the REC 101 controls the data transmission timing at which the radio data is transmitted from the RE 104 will be described. It is assumed that the REC 101 performs control so that the radio data transmitted from the REC 101 is transmitted from the RE 104 in elapse of Ttx time. In this case, the REC 101 further adds a delay time to T12+T2a, which is the data transmission timing when delay control is not performed, so that the radio data can be transmitted from the RE 104 at a data transmission timing of Ttx. Ttx is a desired data transmission timing. When the delay time to be added is defined as Tdelay, relationship among Ttx, T12, T2a, and Tdelay can be expressed as:

$$Ttx = T12 + T2a + Tdelay.$$

When this is expanded so as to obtain Tdelay, it can be expanded as:

$$\begin{aligned} Tdelay &= Ttx = T12 - T2a \\ &= Ttx - (T14 - \text{Toffset})/2 - T2a \end{aligned} \quad (1)$$

That is, the REC 101 can transmit the radio data from the RE 104 at the desired data transmission timing by giving the radio data a delay of Tdelay that satisfies Formula (1).

The radio data transmitted from the REC 101 to the RE 104 is multiplexed to the CPRI frame, and transmitted from the REC 101 to the RE 104 via the CPRI link 102. The minimum time unit by which the radio data can be multiplexed to the CPRI frame is one chip (=260.42 ns=1/3.84 MHz). The delay time given to the radio data to be transmitted to the RE 104 before the REC 101 multiplexes the radio data to the CPRI frame is units of one chip. However, depending on values of T14, Toffset, and T2a, Tdelay may include a time less than one chip.

<Configuration Example of Radio Control Device (REC) according to Comparative Example>

Figure 2:
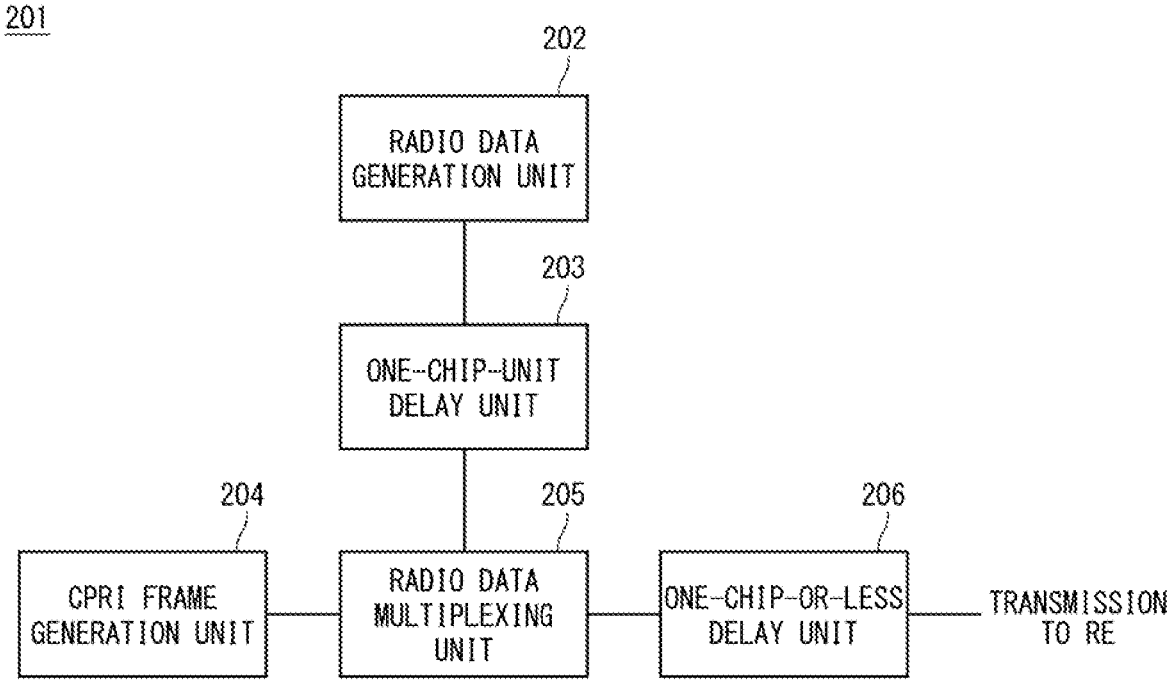
FIG. 2 is a block diagram showing a configuration example of a REC according to a comparative example.

With reference to FIG. 2, a configuration example of a REC 201 according to a comparative example will be described. FIG. 2 is a block diagram showing the configuration example of the REC according to the comparative example. The REC 201 corresponds to the REC 101 shown in FIG. 1, and communicates with the RE 104 shown in FIG. 1 via the CPRI links 102 and 103. Note that as a premise for describing the REC 201, description is made, assuming that Tdelay calculated by Formula (1) is X.Y chips. X is an integer of 0 or more and represents a delay time in units of one chip. Y is an integer of 0 or more and represents a delay time less than one chip.

The REC 201 includes a radio data generation unit 202, a one-chip-unit delay unit 203, a CPRI frame generation unit 204, a radio data multiplexing unit 205, and a one-chip-or-less delay unit 206.

The radio data generation unit 202 generates radio data to be transmitted from the REC 201 to the RE 104.

The one-chip-unit delay unit 203 performs delay control of X chips, on the radio data generated by the radio data generation unit 202. The one-chip-unit delay unit 203 inputs the radio data generated by the radio data generation unit 202, corrects the input radio data so as to give a delay time of X chips, and outputs the radio data delayed by X chips. The minimum unit by which the later-described radio data multiplexing unit 205 can multiplex the radio data to a CPRI frame generated by the later-described CPRI frame generation unit 204 is one chip. The one-chip-unit delay unit 203 gives the delay of X chips, which is a time in units of one chip, to the radio data, and outputs the radio data corrected based on the delay time of X chips.

The CPRI frame generation unit 204 generates a CPRI frame used for communication between the REC 201 and the RE 104. The CPRI frame generation unit 204 generates a basic frame per chip. The basic frame is composed of 16 words, and for a beginning word, a control word for transmission control is set, and for the remaining 15 words, the radio data to be transmitted from the REC 201 to the RE 104 is set. Note that 256 basic frames constitute 1 hyper frame, and for each basic frame of 1 hyper frame, a predefined control word is set. The 256 control words of 1 hyper frame are composed of 64 sub-channels each including 4 control words.

Here, the control word set in each basic frame will be described with reference to FIG. 3. FIG. 3 is a diagram showing control words set in respective basic frames. In FIG. 3, type represents a type of control word. Xs=0, 1, 2, and 3 represent indexes of control words within a sub-channel. Numbers 0-255 set in columns of Xs=0, 1, 2, and 3 represent indexes of 256 control words in 1 hyper frame. Use represents a use of each control word. As shown in FIG. 3, a control word having an index of 0 is defined as a sync byte, and the REC 201 and the RE 104 synchronize and communicate with each other using the control word having an index of 0.

Returning to FIG. 2, the radio data multiplexing unit 205 will be described. The radio data multiplexing unit 205 multiplexes the radio data output by the one-chip-unit delay unit 203 to the CPRI frame (basic frame) generated by the CPRI frame generation unit 204. The radio data multiplexing unit 205 outputs the basic frame with the radio data multiplexed thereto to the one-chip-or-less delay unit 206.

The one-chip-or-less delay unit 206 inputs the basic frame output by the radio data multiplexing unit 205, gives the basic frame a delay of 0.Y chip, and transmits the basic frame delayed by 0.Y chip to the RE 104. Since in the basic frame output by the radio data multiplexing unit 205, the radio data delayed by X chips is set, the one-chip-or-less delay unit 206 delays not only the basic frame but also the radio data set in the basic frame by 0.Y chip. The REC 201 configured like this can make the radio data to be transmitted to the RE 104 the radio data with a delay of X.Y chips given thereto.

Figure 4:
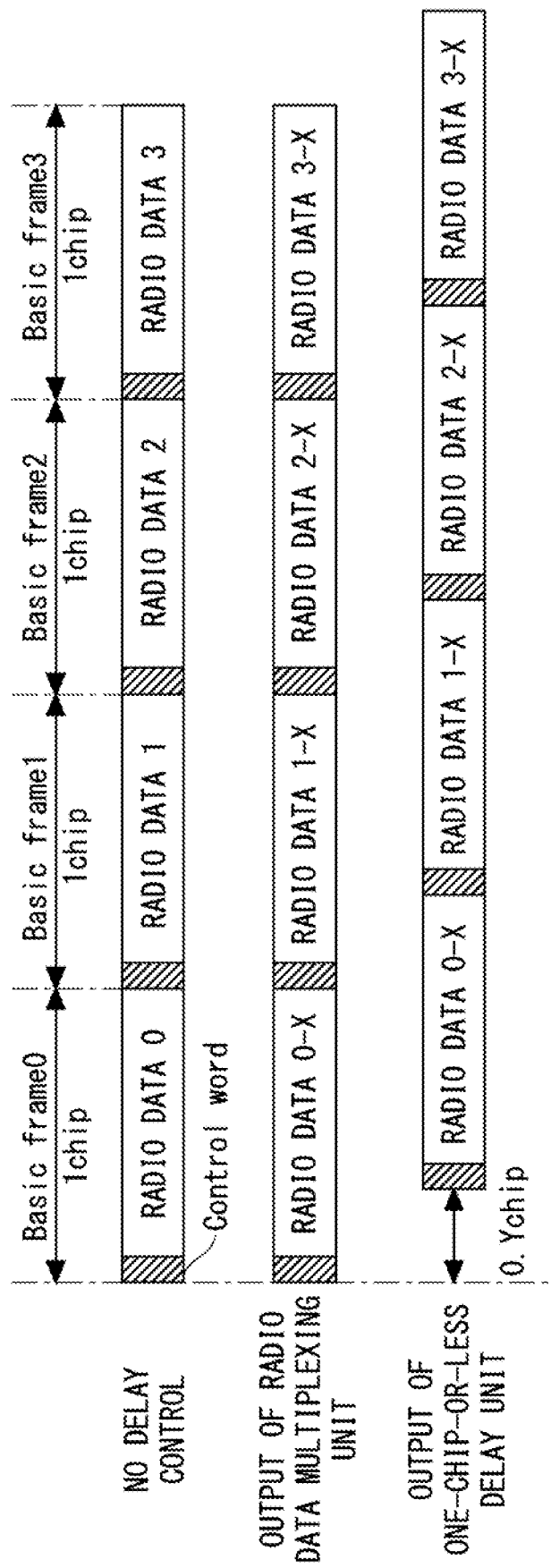
FIG. 4 is a diagram for illustrating a CPRI frame transmission timing of the REC according to the comparative example.

Next, a transmission timing of the CPRI frame which the REC 201 according to the comparative example transmits to the RE 104 will be described with reference to FIG. 4. FIG. 4 is a diagram for illustrating the CPRI frame transmission timing of the REC according to the comparative example. In order to simplify explanation of FIG. 4, description will be made, assuming that the radio data generated by the radio data generation unit 202 is radio data 0, 1, 2, and so on.

In FIG. 4, blocks including control words shown by diagonal lines and radio data shown by white blocks represent basic frames, and in order from the left, basic frames 0, 1, 2, and 3 are shown. Note that in order to simplify description, only the basic frames 0-3 are shown, but the basic frame 4 and later are also generated.

A diagram shown at the top of FIG. 4 shows a transmission timing of the CPRI frame when delay control is not performed in the REC 201. In other words, the diagram shown at the top of FIG. 4 represents the transmission timing of the CPRI frame on an assumption that the REC 201 does not include the one-chip-unit delay unit 203 and the one-chip-or-less delay unit 206. A diagram shown at a second from the top of FIG. 4 represents a situation of the CPRI frame output by the radio data multiplexing unit 205 in the REC 201. A diagram shown at the bottom of FIG. 4 represents a situation of the CPRI frame output by the one-chip-or-less delay unit 206 in the REC 201. In other words, the diagram shown at the bottom of FIG. 4 represents the transmission timing of the CPRI frame transmitted to the RE 104.

As in the diagram shown at the top of FIG. 4, when the delay control is not performed in the REC 201, the same radio data as the number of the basic frame is set in each basic frame. In this case, since the delay control is not performed, in the RE 104, the radio data is not transmitted at the desired transmission timing.

Next, as in the diagram shown at the second from the top of FIG. 4, the radio data delayed by X chips is set in each basic frame, since the REC 201 includes the one-chip-unit delay unit 203. The radio data set in order from the beginning basic frame is radio data (0-X), radio data (1-X), radio data (2-X), and so on.

Lastly, as in the diagram shown at the bottom of FIG. 4, each basic frame is delayed by X.Y chips and the radio data set in each basic frame is also delayed by X.Y chips, since the REC 201 includes the one-chip-or-less delay unit 206. In this way, the radio data transmitted to the RE 104 is given the delay of X.Y chips so as to be the desired transmission timing.

Here, as described with reference to FIG. 3, the REC 201 and the RE 104 synchronize with each other using the control word having an index of 0. As in the diagram shown at the bottom of FIG. 4, when Y is not 0, the CPRI frame is also delayed by 0.Y chips. In other words, since the RE 104 receives the CPRI frame delayed by 0.Y chips, the sync bite, which the RE 104 receives and is the control word having an index of 0, is also delayed by 0.Y chips. In this case, synchronization between the REC 201 and the RE 104 is lost, all the control words and radio data are not correctly transmitted or received between the REC 201 and the RE 104, and communication between the REC 201 and the RE 104 is cut off. In this way, in the REC 201 according to the comparative example, communication between the REC 201 and the RE 104 may be interrupted momentarily, which greatly affects the wireless communication system. Therefore, the inventor has studied a configuration of the REC that can suppress occurrence of momentary interruption between the REC and the RE even when Tdelay includes a time less than one chip.

Outline of Example Embodiment

Figure 5:
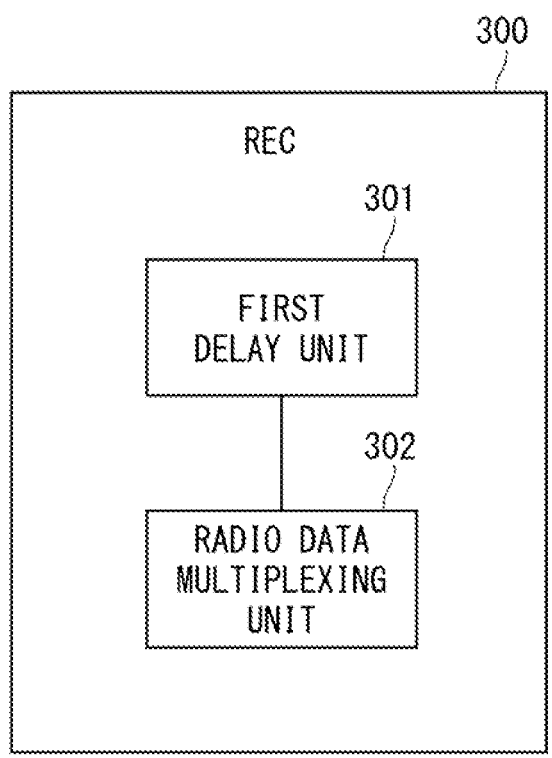
FIG. 5 is a block diagram showing a schematic configuration example of a radio control device according to an example embodiment.

An outline of a radio control device (REC) 300 according to the example embodiment will be described with reference to FIG. 5. FIG. 5 is a block diagram showing a schematic configuration example of a radio control device according to the example embodiment. The REC 300 includes a first delay unit 301, and a radio data multiplexing unit 302. The first delay unit 301 and the radio data multiplexing unit 302 may be implemented by hardware such as a digital circuit or a chip. The first delay unit 301 corresponds to the one-chip-or-less delay unit 206 in the REC 201 according to the comparative example. The REC 201 according to the comparative example has the configuration in which the one-chip-or-less delay unit 206 is placed after the radio data multiplexing unit 205, whereas the REC 300 according to the example embodiment has a configuration in which the first delay unit 301 is placed before the radio data multiplexing unit 302.

The first delay unit 301 performs delay control based on a first delay time less than a unit processing time of the basic frame on the radio data in units of basic frames of the CPRI frame. The first delay unit 301 determines the first delay time based on the desired data transmission timing in the radio device (not shown). The data transmission timing is Ttx. The unit processing time is one chip, which is the unit processing time of the basic frame of the CPRI frame. The first delay time is a delay time less than one chip, included in Tdelay that satisfies Ttx.

The first delay unit 301 inputs the radio data in units of basic frames when a time less than one chip included in Tdelay is included, and performs delay control based on the time, on the input radio data. The first delay unit 301 outputs the radio data that has undergone the delay control to the radio data multiplexing unit 302.

The radio data multiplexing unit 302 multiplexes the radio data that has undergone the delay control to the basic frame. The radio data multiplexing unit 302 inputs the basic frame in which the control word is set and the radio data output from the first delay unit 301. The radio data multiplexing unit 302 multiplexes the radio data output from the first delay unit 301 to a data block in the basic frame. The radio data multiplexing unit 302 transmits, to the RE, the basic frame with the radio data output from the first delay unit 301 multiplexed thereto.

In the REC 300 according to the example embodiment, since the first delay unit 301 is placed before the radio data multiplexing unit 302, the first delay unit 301 does not perform the delay control on the CPRI frame (basic frame), different from the REC 201 according to the comparative example. In other words, the REC 300 performs delay control only on the radio data to be transmitted to the RE without changing the transmission timing of all the control words of the CPRI frame. Therefore, the RE connected to the REC 300 successfully receives all the control words of the CPRI frame, and can receive the radio data that has undergone the delay control to the desired transmission timing. Consequently, according to the REC 300 according to the example embodiment, it is possible to suppress occurrence of momentary interruption between the radio control device and the radio device, so it is possible to eliminate quality deterioration in the wireless communication system.

Patent Literatures 1 and 2 disclose techniques for performing delay control on radio data. The technique disclosed in Patent Literature 1 does not disclose delay control in consideration of a CPRI frame. Therefore, even if the technique disclosed in Patent Literature 1 is used, delay control on the CPRI frame cannot be implemented.

Patent Literature 2 discloses a technique for performing delay control on radio data multiplexed to a CPRI frame. Patent Literature 2 discloses determining a multiplexing position of a basic frame based on an antenna of the RE and a carrier related to the radio data. In other words, in Patent Literature 2, the delay control is performed on the radio data by making the multiplexing position of the radio data variable in the basic frame of a CPRI format. However, the technique disclosed in Patent Literature 2 has a possibility that the basic frame may be occupied, for example, for part of the radio data such as one type in order to cope with various amounts of delay.

In general, in the CPRI frame transmitted and received between the REC and the RE, multiple pieces of radio data related to a plurality of antennas and a plurality of carriers are set in a mixed manner. Therefore, when the technique disclosed in Patent Literature 2 is used, it is assumed that part of the radio data may occupy each CPRI frame (basic frame) in order to cope with different amounts of delay depending on the plurality of antennas and the plurality of carriers. On the other hand, in the example embodiment of the present disclosure, even if radio data to be processed is radio data to be transmitted to a plurality of antennas and a plurality of carriers, delay control can be performed on the radio data without being aware of the antennas and the carriers. Consequently, the example embodiment of the present disclosure can perform desired delay control without being aware of the antennas and the carriers corresponding to the respective pieces of radio data transmitted to the RE, as compared with the technique disclosed in Patent Literature 2. The example embodiment of the present disclosure can multiplex the multiple pieces of radio data corresponding to the plurality of antennas and the plurality of carriers to respective CPRI frames between the REC and the RE. Consequently, according to the example embodiment of the present disclosure, it is possible to increase transmission efficiency of the radio data at the REC and the RE.

EXAMPLE EMBODIMENT

Hereinafter, details of the example embodiment will be described with reference to the drawings.

<Configuration Example of Radio Base Station>

First, a configuration example of a radio base station 1000 according to the example embodiment will be described. The radio base station 1000 according to the example embodiment is basically the same as the radio base station 100 shown in FIG. 1, and has a configuration in which the REC 101 is replaced with a REC 400. Therefore, the configuration example of the radio base station 1000 will be described with reference to FIG. 1. The radio base station 1000 includes the REC 400, the CPRI links 102 and 103, and the radio device 104. Note that the radio base station 1000 is shown as having a configuration including only one radio device 104, but may have a configuration including a plurality of radio devices 104.

The REC 400 is a radio control device that controls the radio base station 1000, and performs baseband signal processing. The REC 400 connects and communicates with the radio device 104 via the CPRI links 102 and 103. The REC 400 communicates with the radio device 104 via the CPRI links 102 and 103 by CPRI.

The CPRI links 102 and 103 are, for example, optical cables. The CPRI links 102 and 103 are transmission paths for performing communication between the REC 400 and the radio device 104 by CPRI frame. The CPRI links 102 and 103 may be referred to as CPRI cables.

The radio device (RE) 104 performs RF signal processing, and transmits a radio signal to the mobile device (UE) (not shown).

<Configuration Example of Radio Control Device (REC)>

Figure 6:
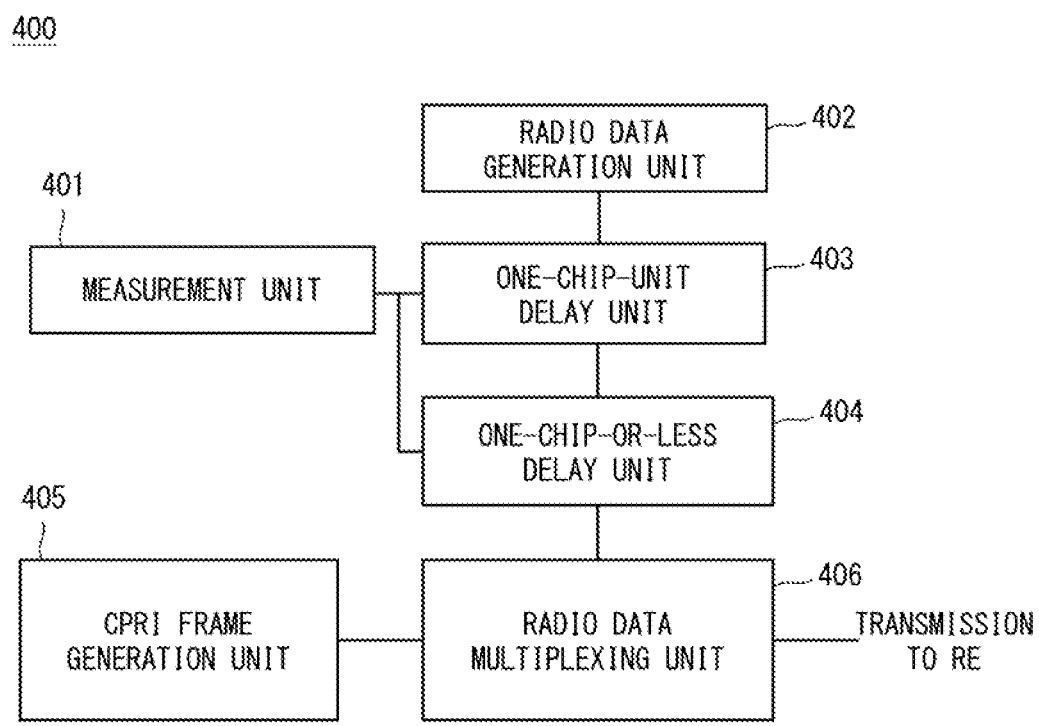
FIG. 6 is a block diagram showing a configuration example of the REC according to the example embodiment.

A configuration example of the radio control device (REC) 400 according to the example embodiment will be described with reference to FIG. 6. FIG. 6 is a block diagram showing the configuration example of the REC according to the example embodiment. The REC 400 corresponds to the REC 101 in FIG. 1, and as in FIG. 1, communicates with the RE 104 via the CPRI links 102 and 103. Also in this example embodiment, description will be made, assuming that Tdelay determined by Formula (1) is X.Y chips. In addition, description will be made, assuming that X is an integer of 0 or more and represents a time in units of one chip, and Y is an integer of 0 or more and represents a time less than one chip.

As shown in FIG. 6, the REC 400 includes a measurement unit 401, a radio data generation unit 402, a one-chip-unit delay unit 403, a one-chip-or-less delay unit 404, a CPRI frame generation unit 405, and a radio data multiplexing unit 406. The measurement unit 401, radio data generation unit 402, one-chip-unit delay unit 403, one-chip-or-less delay unit 404, CPRI frame generation unit 405, and radio data multiplexing unit 406 may be implemented by hardware such as a digital circuit or a chip.

The measurement unit 401 measures the time of T14 in above-described Formula (1) periodically or aperiodically. The measurement unit 401 measures the time of T14 by measuring a time for the CPRI frame timing transmitted from the point R1 of the REC 400 to take to return to the point R4.

Among the times included in Formula (1), Ttx, Toffset, and T2*a* are set, for example, in operation data, and the measurement unit 401 acquires Ttx, Toffset, and T2*a* from the operation data. The measurement unit 401 uses measured T14, acquired Ttx, Toffset, and T2*a*, and Formula (1) to calculate a value of Tdelay. The measurement unit 401 outputs the delay time in units of one chip of Tdelay to the one-chip-unit delay unit 403. The measurement unit 401 outputs the delay time less than one chip of Tdelay to the one-chip-or-less delay unit 404. In this example embodiment, since Tdelay determined by Formula (1) is X.Y chips, the measurement unit 401 outputs a value of X chips of Tdelay to the one-chip-unit delay unit 403. The measurement unit 401 outputs a value of 0.Y chip of Tdelay to the one-chip-or-less delay unit 404.

Ttx, Toffset, and T2*a* may be input to the measurement unit 401 from, for example, a parameter setting tool. The measurement unit 401 may acquire Ttx, Toffset, and T2*a* input from the parameter setting tool.

The radio data generation unit 402 generates radio data to be transmitted from the REC 400 to the RE 104. The radio data generation unit 402 generates radio data in units of basic frames of the CPRI frame. The radio data generation unit 402 outputs the generated radio data to the one-chip-unit delay unit 403.

The one-chip-unit delay unit 403 performs delay control of a delay time according to the unit processing time on the radio data input from the radio data generation unit 402, based on the desired data transmission timing in the RE 104. Specifically, the one-chip-unit delay unit 403 performs delay control based on the delay time of X chips input from the measurement unit 401 on the radio data generated by the radio data generation unit 402. The one-chip-unit delay unit 403 outputs the radio data with the delay time of X chips given thereto to the one-chip-or-less delay unit 404.

The one-chip-or-less delay unit 404 corresponds to the first delay unit 301 described in the outline of the example embodiment. The one-chip-or-less delay unit 404 performs delay control based on the delay time less than one chip, on the radio data in units of basic frames of the CPRI frame, based on the desired data transmission timing in the RE 104. Specifically, the one-chip-or-less delay unit 404 performs delay control based on the delay time of 0.Y chip input from the measurement unit 401, on the radio data output from the one-chip-unit delay unit 403. The one-chip-or-less delay unit 404 performs delay control so as to give the delay time of 0.Y chip to the input radio data. The one-chip-or-less delay unit 404 outputs the radio data with the delay time of 0.Y chip given thereto to the radio data multiplexing unit 406.

Although a detailed configuration of the one-chip-or-less delay unit 404 will be described later, the one-chip-or-less delay unit 404 is configured to be able to perform delay control on the radio data input from the one-chip-unit delay unit 403, based on a plurality of delay times less than one chip, which is the unit processing time. The one-chip-or-less delay unit 404 selects 0.Y chip from the plurality of delay times based on Tdelay related to the data transmission timing, and performs delay control of the input radio data based on the delay time of 0.Y chip.

The CPRI frame generation unit 405 generates a basic frame used for communication between the REC 400 and the RE 104 for each chip. The CPRI frame generation unit 405 sets a control word corresponding to a basic frame number shown in FIG. 3 in an area where the control word of the generated basic frame is set. The CPRI frame generation unit 405 outputs the generated basic frame to the radio data multiplexing unit 406.

The radio data multiplexing unit 406 multiplexes the radio data that has undergone the delay control to the basic frame. The radio data multiplexing unit 406 multiplexes the radio data on which the delay control is performed by the one-chip-unit delay unit 403 and the one-chip-or-less delay unit 404 to the CPRI frame input from the CPRI frame generation unit 405. The radio data multiplexing unit 406 sets the radio data output from the first delay unit 301 in the data block, where the radio data is set, of the input basic frame. In this way, the radio data multiplexing unit 406 generates a basic frame to which the radio data that has undergone the delay control based on the delay time of X.Y chips is multiplexed. The radio data multiplexing unit 406 transmits, to the RE 104, the basic frame to which the radio data that has undergone the delay control based on the delay time of X.Y chips is multiplexed.

<Details of Configuration Example of One-Chip-or-Less Delay Unit>

Figure 7:
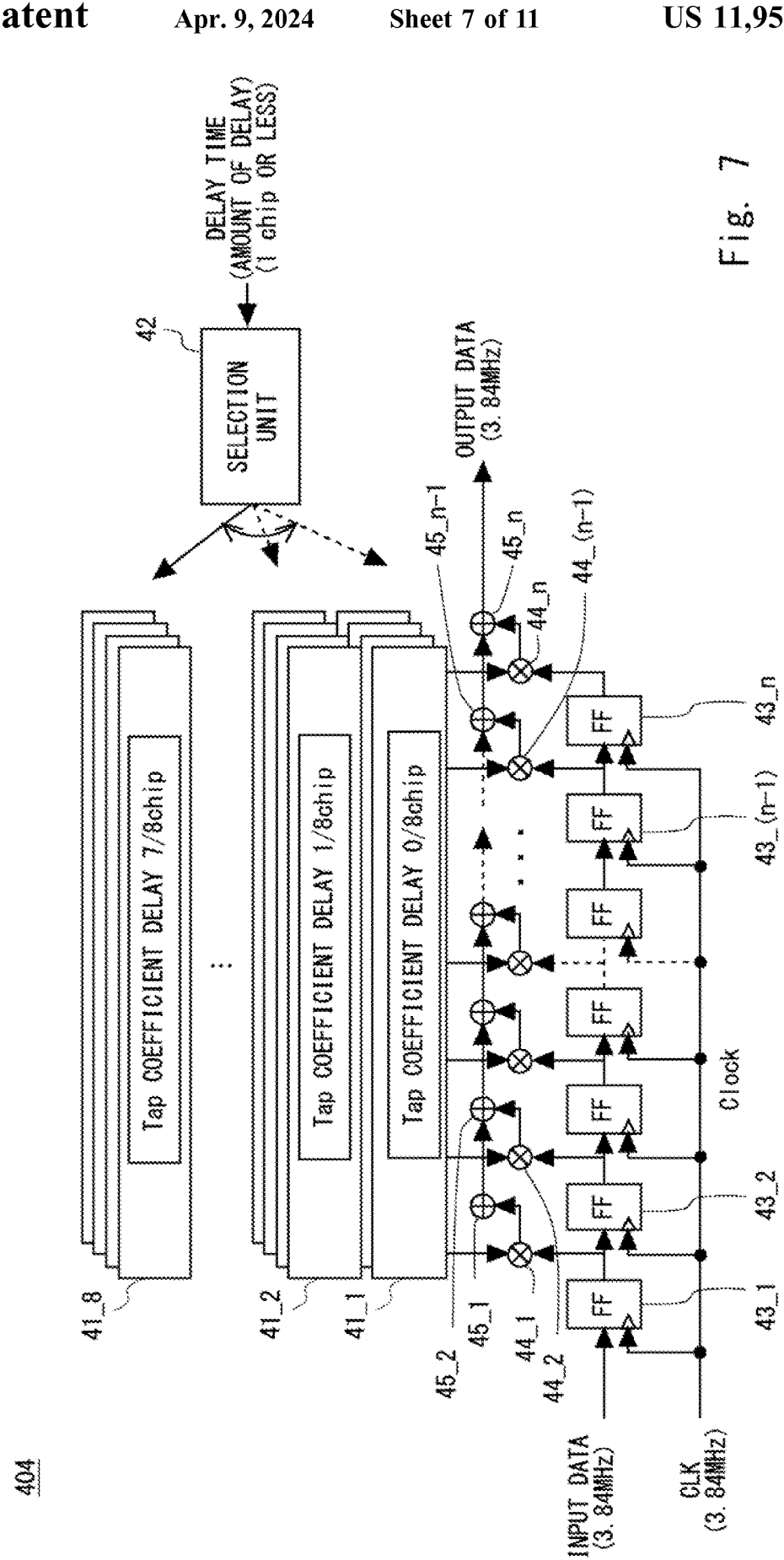
FIG. 7 is a diagram for illustrating details of a configuration example of a one-chip-or-less delay unit.

Next, details of a configuration example of the one-chip-or-less delay unit 404 will be described with reference to FIG. 7. FIG. 7 is a diagram for illustrating details of the configuration example of the one-chip-or-less delay unit. The one-chip-or-less delay unit 404 is implemented by, for example, a digital filter such as a FIR (Finite Impulse Response) filter. FIG. 7 is a diagram showing an example of the one-chip-or-less delay unit 404, the radio data is processed for each chip (=260. 42 ns=1/3.84 MHz), and a configuration example of the digital filter when resolution of one chip or less is set to 1/8 chip is shown.

The one-chip-or-less delay unit 404 includes tables 41_1 to 41_$n$, a selection unit 42, FFs (flip-flop) 43_1 to 43_$n$, multipliers 44_1 to 44_$n$, and adders 45_1 to 45_$n$. The FF 43_$k$ (k: 1–n), the multiplier 44_$k$, and the adder 45_$k$ of the configuration of the one-chip-or-less delay unit 404 constitute a tap of a kth-stage. In other words, the one-chip-or-less delay unit 404 has n stages of taps and has a configuration in which the number of filter stages is n. Note that the number of filter stages may be set as appropriate, but since a fixed delay occurs according to the number of digital filter stages, it is necessary to set the number of stages in consideration of the fixed delay.

The tables 41_1 to 41_8 are tables retaining tap coefficients corresponding to a plurality of delay times less than one chip. The one-chip-or-less delay unit 404 includes the tables 41_1 to 41_8 so that the delay control can be performed on the radio data input from the one-chip-unit delay unit 403, based on the plurality of delay times less than one chip.

The table 41_1 is a table that retains a plurality of tap coefficients which are set in the multipliers included in the taps of the respective stages and are for 0/8 chip. Each of the tables 41_2 to 41_8 is similarly a table that retains a plurality of tap coefficients which are set in the multipliers included in the taps of the respective stages and are for 1/8 to 7/8 chip, respectively. Note that in the example shown in FIG. 7, since the resolution of one chip or less is 1/8 chip, the number of tables is 8, but the number of tables is set according to the resolution of one chip or less.

The selection unit 42 selects any table from the tables 41_1 to 41_8 based on the desired data transmission timing in the RE 104. The selection unit 42 inputs the delay time less than one chip included in Tdelay, output from the measurement unit 401. The selection unit 42 selects a table retaining a plurality of tap coefficients corresponding to the input delay time from the tables 41_1 to 41_8. The selection unit 42 sets the plurality of tap coefficients retained in the selected table, for the multipliers 44_1 to 44_$n$.

In this example embodiment, the selection unit 42 is supplied with 0.Y chip, which is the delay time less than one chip included in Tdelay, from the measurement unit 401. The selection unit 42 selects a table retaining a plurality of tap coefficients corresponding to the delay time of 0.Y chip from the tables 41_1 to 41_8. The selection unit 42 sets the plurality of tap coefficients retained in the selected table, for the multipliers 44_1 to 44_$n$.

For example, it is assumed that the selection unit 42 is supplied with a delay time of 1/8 chip from the measurement unit 401. In this case, the selection unit 42 selects the table 41_2 retaining a plurality of tap coefficients for 1/8 chip from the tables 41_1 to 41_8. In addition, for example, it is assumed that the selection unit 42 is supplied with a delay time of 2/8 chip from the measurement unit 401. In this case, the selection unit 42 selects the table 41_3 retaining a plurality of tap coefficients for 2/8 chip from the tables 41_1 to 41_8. The selection unit 42 sets the plurality of tap coefficients retained in the selected table, for the multipliers 44_1 to 44_$n$.

The FF 43_1 inputs the radio data, which is input data, and a 3.84 MHz clock signal synchronized with the radio data. The FF 43_1 holds a value of the radio data of the clock signal, and updates the held value according to a rise of the clock signal. The FF 43_1 outputs the held value to the FF 43_2 and the multiplier 44_1. The FFs 43_2 to 43_$n$ input the values output from the FF 43_1 to 43_$(n-1)$ and the 3.84 MHz clock signal, respectively. The FFs 43_2 to 43_$n$ hold the values output from the FFs 43_1 to 43_$(n-1)$ respectively, and update the held values according to a rise of the clock signal. The FFs 43_2 to 43_$(n-1)$ output the held values to the FFs 43_3 to 43_$n$ and the multipliers 44_2 to 44_$(n-1)$, respectively. The FF 43_$n$ outputs the held value to the multiplier 44_$n$. The multipliers 44_1 to 44_$n$ multiply the values output from the FFs 43_1 to 43_$n$ by the tap coefficients corresponding to the respective stages among the plurality of tap coefficients retained in the selected table, respectively. The multipliers 44_1 to 44_$n$ output values obtained by multiplying the values output from the FFs 43_1 to 43_$n$ by the tap coefficients to the adders 45_1 to 45_$n$, respectively.

The adder 45_1 outputs the value output from the multiplier 44_1 to the adder 45_2. The adders 45_2 to 45_$(n-1)$ add the values output from the adders 45_1 to 45_$(n-2)$ and the values output from the multipliers 44_2 to 44_$(n-1)$, and output values obtained by adding the two values, to the adders 45_3 to 45_$(n-1)$, respectively. The adder 45_$n$ adds the value output from the adder 45_$(n-1)$ and the value output from the multiplier 44_$n$, and outputs a value obtained by adding the two values, as output data, to the radio data multiplexing unit 406.

Figure 8:
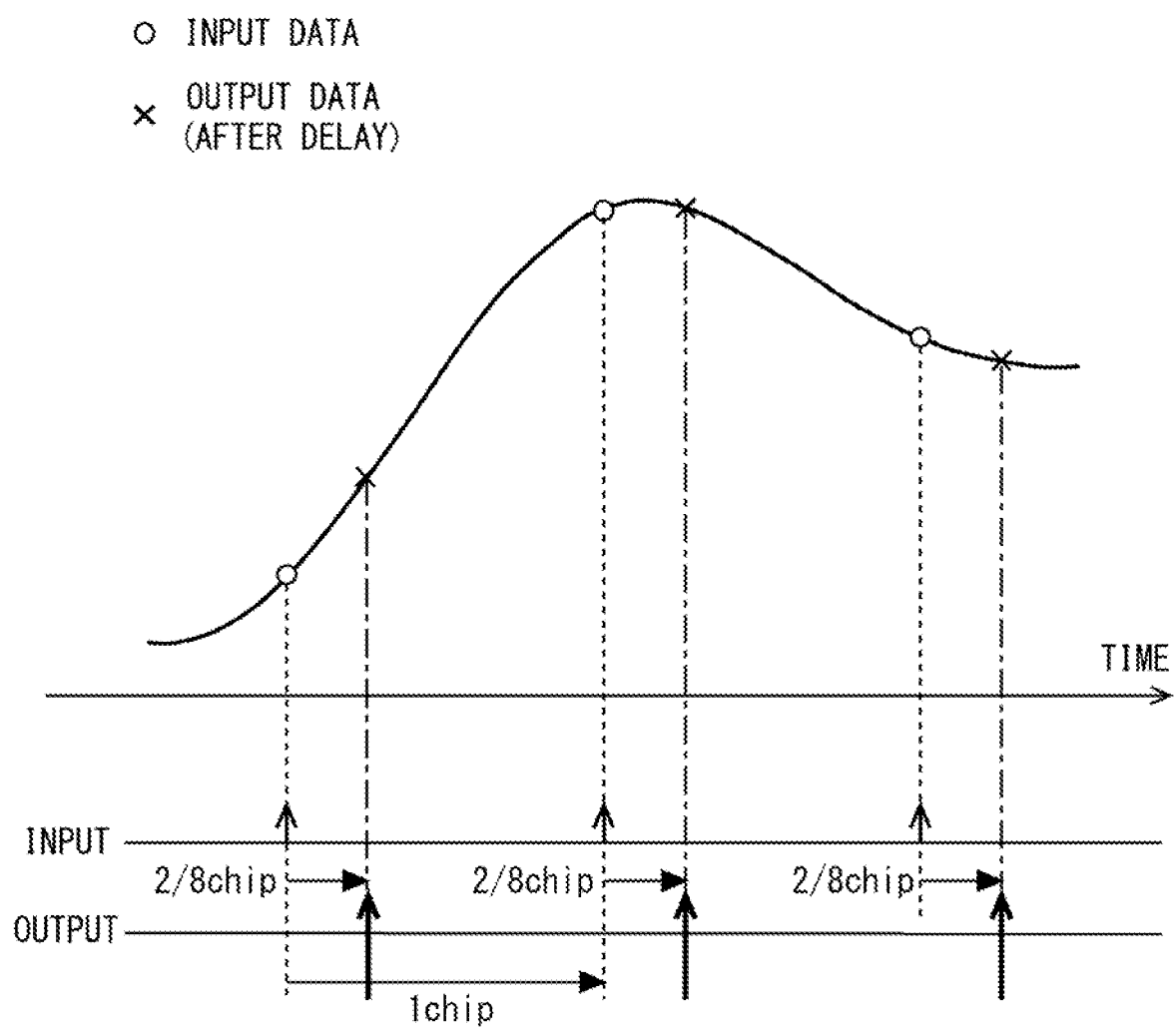
FIG. 8 is a diagram for illustrating radio data input in and output from the one-chip-or-less delay unit.

Next, relationship between the radio data input to the one-chip-or-less delay unit 404 and the radio data output from the one-chip-or-less delay unit 404 will be described with reference to FIG. 8. FIG. 8 is a diagram for illustrating the radio data input to and output from the one-chip-or-less delay unit. In FIG. 8, a horizontal axis is an axis representing time. In FIG. 8, ○ represents input data, and x output data. FIG. 8 represents the input data and the output data when a delay time of 2/8 chip is input to the selection unit 42. The selection unit 42 can output the radio data in which the delay time of 2/8 chip is given to the input radio data by selecting the table 41_3 retaining the plurality of tap coefficients for 2/8 chip from the tables 41_1 to 41_8. In this way, the selection unit 42 selects tap coefficients that can give an appropriate delay time to the radio data by selecting an appropriate table based on the input delay time less than one chip. The one-chip-or-less delay unit 404 interpolates the radio data input at intervals of one chip by oversampling by the digital filter such as the FIR filter, and can output the radio data in which an appropriate delay time less than one chip is given to the input data.

Figure 9:
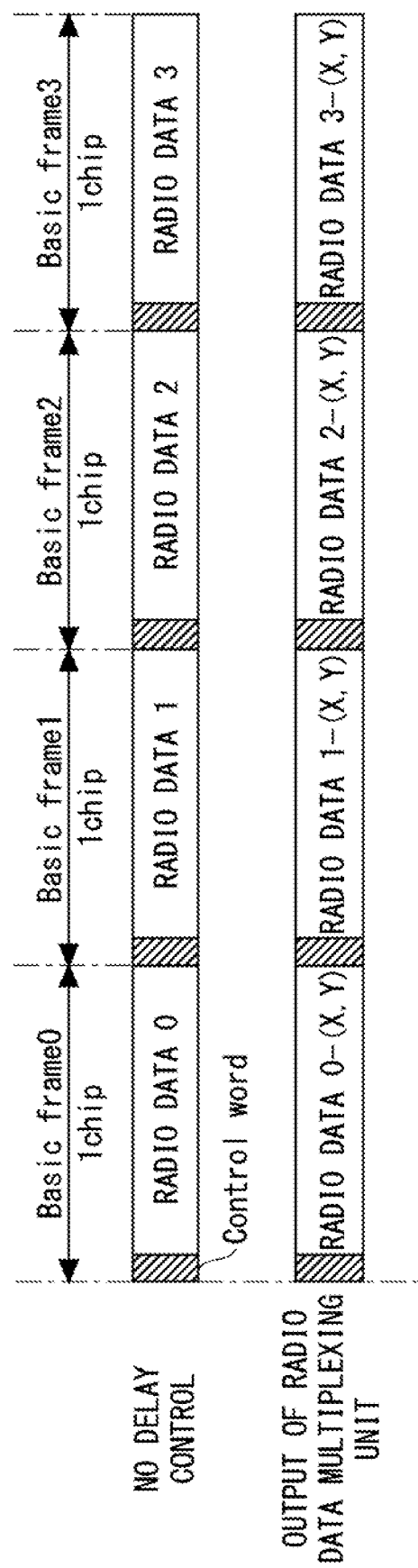
FIG. 9 is a diagram for illustrating a CPRI frame transmission timing of the REC according to the example embodiment.

Next, a transmission timing of the CPRI frame which the REC 400 according to the example embodiment transmits to the RE 104 will be described with reference to FIG. 9. FIG. 9 is a diagram for illustrating the CPRI frame transmission timing of the REC according to the example embodiment. FIG. 9 corresponds to FIG. 4. In order to simplify explanation of FIG. 9, description will be made, assuming that the radio data generated by the radio data generation unit 402 is radio data 0, 1, 2, and so on.

In FIG. 9, blocks composed of control words shown by diagonal lines and radio data shown by white blocks represent basic frames, and in order from the left, show basic frames 0, 1, 2, and 3. Note that only the basic frames 0-3 are shown in FIG. 9, but the basic frame 4 and later are also generated.

A diagram shown at the top of FIG. 9 shows a transmission timing of the CPRI frame when delay control is not performed in the REC 400, and is the same as the diagram shown at the top of FIG. 4. A diagram shown at the bottom of FIG. 9 represents a situation of the CPRI frame output by the radio data multiplexing unit 406 in the REC 400. In other words, the diagram shown at the bottom of FIG. 9 represents the transmission timing of the CPRI frame transmitted to the RE 104.

As in the diagram shown at the bottom of FIG. 9, in the REC 400, the one-chip-unit delay unit 403 and the one-chip-or-less delay unit 404 are placed before the radio data multiplexing unit 406. Therefore, the radio data which has been delayed by X chips by the one-chip-unit delay unit 403 and by 0.Y chip by the one-chip-or-less delay unit 404 is input to the radio data multiplexing unit 406. The radio data multiplexing unit 406 multiplexes the radio data delayed by X.Y chips to the basic frame of the CPRI frame. Therefore, as in the diagram shown at the bottom of FIG. 9, the REC 400 can delay only the radio data by X.Y chips without changing a timing of the control word of the CPRI frame. That is, since the REC 400 does not change the timing of the control word of the CPRI frame, the RE 104 can accurately receive the CPRI frame transmitted from the REC 400. Consequently, it is possible to suppress occurrence of momentary interruption between the REC 400 and the RE 104.

<Operation Example of Radio Control Device (REC)>

Figure 10:
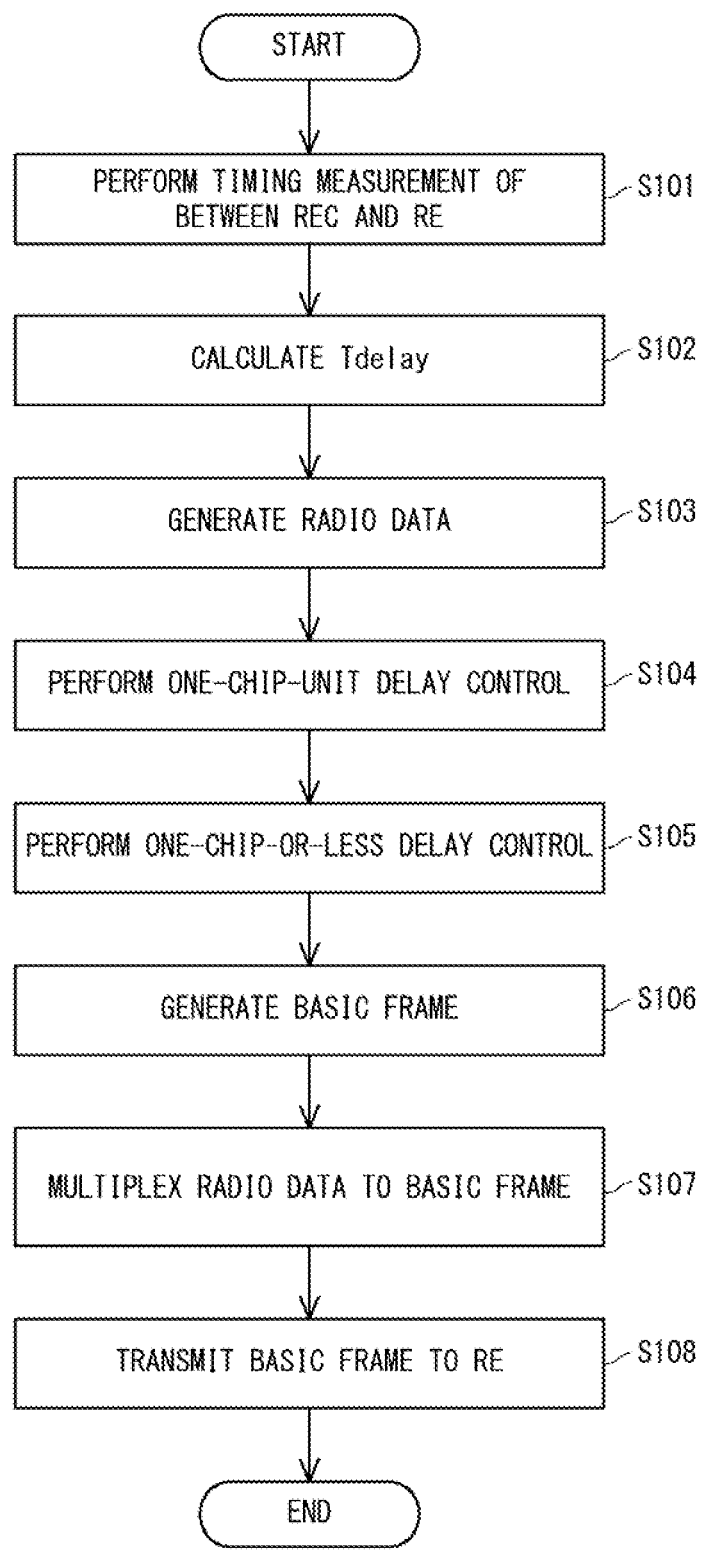
FIG. 10 is a flowchart showing an operation example of the REC according to the example embodiment.

An operation example of the REC 400 according to the example embodiment will be described with reference to FIGS. 10 and 7. FIG. 10 is a flowchart showing the operation example of the REC according to the example embodiment.

First, an overall operation of the REC 400 according to the example embodiment will be described with reference to FIG. 10. In the flowchart shown in FIG. 10, steps S103 to S108 are performed for each chip. Steps S101 and S102 are performed by the measurement unit 401 periodically at an arbitrary cycle or aperiodically at an arbitrary timing.

The measurement unit 401 performs timing measurement between the REC 400 and the RE 104 (step S101). Specifically, the measurement unit 401 measures the time of T14 by measuring a time for the CPRI frame timing transmitted from the point R1 of the REC 400 to take to return to the point R4.

The measurement unit 401 calculates Tdelay (step S102). The measurement unit 401 uses measured T14, acquired Ttx, Toffset, and T2a, and Formula (1) to calculate the value of Tdelay. The measurement unit 401 may acquire Ttx, Toffset, and T2a from the operation data. Alternatively, the measurement unit 401 may acquire Ttx, Toffset, and T2a input from the parameter setting tool. The measurement unit 401 outputs the delay time in units of one chip of Tdelay to the one-chip-unit delay unit 403. The measurement unit 401 outputs the delay time less than one chip of Tdelay to the one-chip-or-less delay unit 404.

The radio data generation unit 402 generates radio data to be transmitted from the REC 400 to the RE 104 (step S103). The radio data generation unit 402 generates radio data in units of basic frames of the CPRI frame for each chip, and outputs the generated radio data to the one-chip-unit delay unit 403.

The one-chip-unit delay unit 403 performs one-chip-unit delay control on the radio data input from the radio data generation unit 402 (step S104). Specifically, the one-chip-unit delay unit 403 performs delay control based on the delay time in units of one chip input from the measurement unit 401 on the radio data generated by the radio data generation unit 402. The one-chip-unit delay unit 403 outputs the radio data that has undergone the delay control to the one-chip-or-less delay unit 404.

The one-chip-or-less delay unit 404 performs one-chip-or-less delay control on the radio data input from the radio data generation unit 402 (step S105). Specifically, the one-chip-or-less delay unit 404 performs delay control of the delay time less than one chip input from the measurement unit 401, on the radio data output from the one-chip-unit delay unit 403. The one-chip-or-less delay unit 404 outputs the radio data that has undergone the delay control to the radio data multiplexing unit 406.

The CPRI frame generation unit 405 generates a basic frame for each chip (step S106). The CPRI frame generation unit 405 sets the control word corresponding to a basic frame number in an area where the control word of the generated basic frame is set. The CPRI frame generation unit 405 outputs the generated basic frame to the radio data multiplexing unit 406.

The radio data multiplexing unit 406 multiplexes the radio data that has undergone the delay control to the basic frame (step S107). The radio data multiplexing unit 406 multiplexes the radio data that has undergone the delay control at the one-chip-unit delay unit 403 and the one-chip-or-less delay unit 404 to the CPRI frame input from the CPRI frame generation unit 405.

The radio data multiplexing unit 406 transmits, to the RE 104, the basic frame to which the radio data that has undergone the delay control is multiplexed (step S108).

Next, an operation example of the one-chip-or-less delay unit 404 and in step S105 in FIG. 10 will be described with reference to FIG. 7.

The selection unit 42 inputs the delay time less than one chip included in Tdelay, output from the measurement unit 401. The selection unit 42 selects a table retaining a plurality of tap coefficients corresponding to the input delay time from the tables 41_1 to 41_8. The selection unit 42 sets the plurality of tap coefficients retained in the selected table for the multipliers 44_1 to 44_$n$.

The FF 43_1 inputs the radio data, which is input data, and a 3.84 MHz clock signal synchronized with the radio data. The FFs 43_2 to 43_$n$ input values output from the FFs 43_1 to 43_$(n-1)$ and the 3.84 MHz clock signal, respectively.

Multipliers 44_1 to 44_$n$ input tap coefficients corresponding to respective stages among the plurality of tap coefficients retained in the table selected by the selection unit 42. The multipliers 44_1 to 44_$n$ multiply values output from the FFs 43_1 to 43_$n$ by the input tap coefficients, respectively.

The adder 45_1 outputs a value output from the multiplier 44_1 to the adder 45_2. The adders 45_2 to 45_$(n-1)$ add values output from the adders 45_1 to 45_$(n-2)$ and values output from the multipliers 44_2 to 44_$(n-1)$, and output values obtained by adding the two values to the adders 45_3 to 45_$(n-1)$, respectively. The adder 45_$n$ adds a value output from the adder 45_$(n-1)$ and the value output from the multiplier 44_$n$, and outputs a value obtained by adding the two values, as output data, to the radio data multiplexing unit 406.

As described above, in the REC 400, the one-chip-unit delay unit 403 and the one-chip-or-less delay unit 404 are placed before the radio data multiplexing unit 406. Therefore, the REC 400 performs the delay control based on the data transmission timing, only on the radio data without changing the timing of the control word of the CPRI frame. Since the REC 400 does not change the timing of the control word of the CPRI frame, the RE 104 can accurately receive the CPRI frame transmitted from the REC 400. Consequently, according to REC 400 according to the example embodiment, it is possible to suppress occurrence of momentary interruption between the REC 400 and the RE 104, so it is possible to eliminate quality deterioration in the wireless communication system.

Other Embodiments

In the above example embodiment, it is described that each configuration of the radio control devices (REC) 300 and 400 (hereinafter referred to as REC 300 and the like) is implemented by hardware, but the configuration may be implemented by software or a module. When each configuration of the REC 300 and the like is implemented by software or a module, the REC 300 and the like may have a hardware configuration as in FIG. 11. In the REC 300 and the like, a processor executes a program stored in a memory, and thereby processing performed by each configuration of the REC 300 and the like may be performed.

Figure 11:
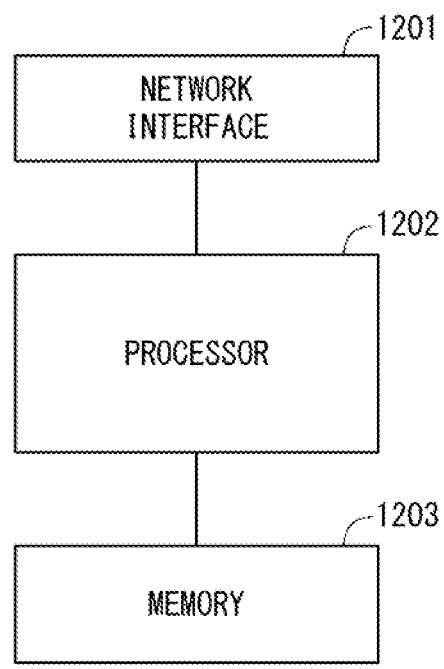
FIG. 11 is a block diagram exemplifying a hardware configuration of a computer (information processing device)

Referring to FIG. 11, the REC 300 and the like include a network interface 1201, a processor 1202, and a memory 1203. The network interface 1201 is used to communicate with another communication device with a communication function. The network interface 1201 may include a network interface card (NIC) compliant with communication methods including, for example, IEEE (Institute of Electrical and Electronics Engineers) 802.11 series and IEEE 802.3 series. The network interface may be a network interface that supports CPRI.

The processor 1202 reads and executes software (computer program) from the memory 1203, and thereby performs the processing of the REC 300 and the like described using the flowchart and the like in the above example embodiment. The processor 1202 may be, for example, a microprocessor, an MPU (Micro Processing Unit), or a CPU (Central Processing Unit). The processor 1202 may include a plurality of processors.

The memory 1203 is composed of a combination of a volatile memory and a nonvolatile memory. The memory 1203 may include a storage disposed away from the processor 1202. In that case, the processor 1202 may access the memory 1203 via an I/O (Input/Output) interface (not shown).

In the example of FIG. 11, the memory 1203 is used to store software module groups. The processor 1202 reads and executes the software module groups from the memory 1203 and thereby can perform the processing of the REC 300 and the like described in the above example embodiment.

As described with reference to FIG. 11, each of the processors of the REC 300 and the like executes one or more programs including a command group for causing a computer to perform the algorithm described with reference to the drawings.

In the above example, the programs can be stored using various types of non-transitory computer-readable media and supplied to the computer. The non-transitory computer-readable media include various types of tangible storage media. Examples of the non-transitory computer-readable media include magnetic recording media (for example, flexible disk, magnetic tape, and hard disk drive) and magneto-optical recording media (for example, magneto-optical disk). Furthermore, the examples of the non-transitory computer-readable media include a CD-ROM (Read Only Memory), a CD-R, a CD-R/W, a DVD-ROM (Digital Versatile Disc Read Only Memory), a DVD-R (DVD recordable), a DVD-R DL (DVD-R Dual Layer), a DVD-RW (DVD ReWritable), a DVD-RAM, a DVD+R, a DVD+R DL, a DVD+RW, a BD-R (Blue-Ray® Disc Recordable), a BD-RE (Blue-Ray® Disc Rewritable), and a BD-ROM. Furthermore, the examples of the non-transitory computer-readable media include semiconductor memories. The semiconductor memories include, for example, a mask ROM, a PROM (Programmable ROM), an EPROM (Erasable PROM), a flash ROM, and a RAM (Random Access Memory). The programs may be supplied to the computer by various types of transitory computer-readable media. Examples of the transitory computer-readable media include an electric signal, an optical signal, and an electromagnetic wave. The transitory computer-readable media can supply the programs to the computer via a wired communication path, such as an electric wire and an optical fiber, or a wireless communication path.

Although the present disclosure has been described above with reference to the above example embodiments, the present disclosure is not limited to the above example embodiments. Various changes that can be understood by those skilled in the art can be made within the scope of the present disclosure for the configurations and details of the present disclosure.

According to the present disclosure, it is possible to provide the radio control device, the communication control method, and the radio base station that can eliminate quality deterioration in a wireless communication system.

What is claimed is:

1. A radio control device comprising:
   at least one processor; and
   at least one memory storing instructions executable by the at least one processor to:
   perform delay control on radio data according to a first delay time that is less than a basic frame unit processing time, in units of basic frames of a CPRI (Common Public Radio Interface) frame, based on a desired data transmission timing in a radio device; and
   multiplex the radio data that has undergone the delay control, wherein
   the delay control is performable on the radio data according to a plurality of delay times less than the basic frame unit processing time, and
   the instructions are executable by the at least one processor to further:
   select the first delay time from the plurality of delay times, based on the desired data transmission timing;
   store a plurality of tables that each include a plurality of tap coefficients corresponding to the plurality of delay times;
   select, from the plurality of tables, the table retaining the plurality of first tap coefficients, based on the desired data transmission timing; and
   implement a digital filter in which the plurality of first tap coefficients corresponding to the first delay time are set for a multiplier.

2. The radio control device according to claim 1, wherein the instructions are executable by the at least one processor to further perform the delay control on the radio data according to a second delay time based on the basic frame unit processing time on the radio data, based on the desired data transmission timing.

3. A communication control method comprising:
performing, by a processor, delay control on radio data according to a first delay time that is less than a basic frame unit processing time, in units of basic frames of a CPRI (Common Public Radio Interface) frame, based on a desired data transmission timing in a radio device;
multiplexing, by the processor, the radio data that has undergone the delay control,
wherein the delay control is performable on the radio data according to a plurality of delay times less than the basic frame unit processing time;
selecting, by the processor, the first delay time from the plurality of delay times, based on the desired data transmission timing;
storing, by the processor, a plurality of tables that each include a plurality of tap coefficients corresponding to the plurality of delay times; and
selecting, by the processor and from the plurality of tables, the table retaining the plurality of first tap coefficients, based on the desired data transmission timing; and
implementing, by the processor, a digital filter in which a plurality of first tap coefficients corresponding to the first delay time are set for a multiplier.

4. A radio base station comprising:
a radio control device and a radio device,
wherein the radio control device is configured to
perform delay control on radio data according to a first delay time that is less than a basic frame unit processing time, in units of basic frames of a CPRI (Common Public Radio Interface) frame, based on a desired data transmission timing in the radio device; and
multiplex the radio data that has undergone the delay control, wherein
the delay control is performable on the radio data according to a plurality of delay times less than the basic frame unit processing time, and
the radio control device is configured to further:
select the first delay time from the plurality of delay times, based on the desired data transmission timing;
store a plurality of tables that each include a plurality of tap coefficients corresponding to the plurality of delay times;
select, from the plurality of tables, the table retaining the plurality of first tap coefficients, based on the desired data transmission timing; and
implement a digital filter in which the plurality of first tap coefficients corresponding to the first delay time are set for a multiplier.

* * * * *